US007491903B2

(12) United States Patent
Hybiske et al.

(10) Patent No.: US 7,491,903 B2
(45) Date of Patent: Feb. 17, 2009

(54) CABLE ORGANIZER

(76) Inventors: Jim Hybiske, 21330 Broadway, Sonoma, CA (US) 95476; Steve Owles, 2 James Black Cir., Novato, CA (US) 94949

( * ) Notice: Subject to any disclaimer, the term of this patent is extended or adjusted under 35 U.S.C. 154(b) by 160 days.

(21) Appl. No.: 11/607,710

(22) Filed: Nov. 30, 2006

(65) Prior Publication Data

US 2007/0123095 A1 May 31, 2007

Related U.S. Application Data

(60) Provisional application No. 60/741,429, filed on Nov. 30, 2005, provisional application No. 60/810,686, filed on Jun. 1, 2006.

(51) Int. Cl.
*H02B 1/40* (2006.01)

(52) U.S. Cl. ......................... 174/480; 174/481; 174/53; 174/135; 385/134; 385/135; 439/501

(58) Field of Classification Search ................. 174/480, 174/481, 483, 497, 500, 503, 506, 50, 53, 174/57, 58, 135, 101, 72 A; 220/3.2, 3.3, 220/3.8, 3.94; 385/134, 135; 439/501, 4, 439/131; 108/50.02; 312/223.1, 223.2, 223.3, 312/223.6; 248/906, 343, 349.1, 49, 68.1
See application file for complete search history.

(56) References Cited

U.S. PATENT DOCUMENTS

| | | | | |
|---|---|---|---|---|
| 1,066,215 | A * | 7/1913 | Murray | 220/3.94 |
| 5,201,484 | A * | 4/1993 | Thoen | 248/68.1 |
| 5,516,298 | A * | 5/1996 | Smith | 439/131 |
| 6,192,805 | B1 * | 2/2001 | Saylor et al. | 108/50.02 |
| 6,410,855 | B1 * | 6/2002 | Berkowitz et al. | 108/50.02 |
| 7,070,459 | B2 * | 7/2006 | Denovich et al. | 385/134 |
| 7,078,617 | B1 * | 7/2006 | Luciere | 174/500 |
| 7,098,406 | B1 * | 8/2006 | Hammonds | 174/135 |
| 7,183,501 | B2 * | 2/2007 | Bowman | 174/480 |
| 7,247,799 | B2 * | 7/2007 | Mori et al. | 174/135 |
| 7,296,775 | B2 * | 11/2007 | Mayer | 248/349.1 |
| 7,359,610 | B2 * | 4/2008 | Vongseng | 385/135 |

OTHER PUBLICATIONS http://cableorganizer.com/cable-turtle/.; Cable Turtle Organizer, Electrical Cable Cord and Wire Management; pp. 1-3.

* cited by examiner

*Primary Examiner*—Angel R Estrada
(74) *Attorney, Agent, or Firm*—James A. Gavney, Jr.

(57) ABSTRACT

A cable organizer is disclosed. The cable organizer includes a cable spool that is mountable to an underside of a support surface and is used to organize, store and separate cables and power cables used to operate and power electrical appliances. The cable spool is formed from cup structures that are fitted or snapped together and that include the flexible shells or skirts and core portions. The cable organizer preferably includes a surge protected power supply with a plurality of power outlets for providing power to power cables organized, stored and separated by the cable organizer. The power supply is preferably mountable between the cable spool and the underside of the work surface.

17 Claims, 7 Drawing Sheets

CABLE ORGANIZER

RELATED APPLICATION(S)

This Patent Application claims priority under 35 U.S.C. §119 (e) of the U.S. Provisional Patent Application Ser. No. 60/741,429, filed Nov. 30, 2005, and titled "A CABLE ORGANIZER" and the U.S. Provisional Patent Application Ser. No. 60/810,686, filed Jun. 1, 2006, and titled "A CABLE ORGANIZER WITH SURGE PROTECTION." The U.S. Provisional Patent Application Ser. No. 60/741,429, filed Nov. 30, 2005, and titled "A CABLE ORGANIZER" and the U.S. Provisional Patent Application Ser. No. 60/810,686, filed Jun. 1, 2006, and titled "A CABLE ORGANIZER WITH SURGE PROTECTION," are both hereby incorporated by reference.

FIELD OF THE INVENTION

This invention relates generally to devices and systems for organizing, storing and separating cables. More specifically, this invention relates to devices and systems for organizing, storing and separating cables used to network and/or power electronic appliances.

BACKGROUND

Electronic appliances are typically networked in a spatial arrangement to organize a functioning computer work station or a home entertainment system. The electronic appliances are networked through cables and powered through dedicated power cables or cords. Each of the electrical appliances are manufactured with cables and power cables or cords that have different lengths. Depending on the particular spatial arrangement chosen, varying amounts of the cables and power cords are needed. Accordingly, there is often a range of lengths of excess cables and power cables or cords which need to be organized and stored.

These excess portions of the cables and the power cables or cords can be bundled with clips, plastic ties, wraps, tape and the like However, each time an electrical appliance is moved or replaced, the clips, plastic ties, wraps and tape need to be removed. Further, each time an electrical appliance is moved or replaced the cables and power cables or cords tend to become entangled, which is not only unattractive, but is also a fire hazard.

Accordingly, there is a need for a cable organizer that can be used to organize, store and separate cables and power cables or cords from a group of electrical appliances. Preferably, the cable organizer is readily adapted to changes in the configuration or spacial arrangement of the group electrical appliances.

SUMMARY OF THE INVENTION

A device and system for organizing, storing and separating cables is disclosed. The system and device of the present invention are also referred to herein as a cable organizer. The cable organizer can be used to organize, store and separate any type of cable or cables but preferably is used to organize, store and separate cables and power cables, such as those that are used for computers, computer monitors, printers, copier machines and facsimile machines, televisions, audio players or any other type of electrical appliance.

In accordance with the embodiments of the invention, the cable organizer is configured to mount to a surface, such as a portion of a floor or a wall. Preferably, the cable organizer is configured to mount to an underside surface of a desk, table or a work station. The cable organizer can be permanently mounted to the surface or detachably mounted to the surface. The cable organizer is mounted to the surface through any suitable bracketing mechanism known in the art including, but not limited to, fitted snap bracketing mechanisms, clip bracketing mechanisms, threaded bracketing mechanisms, screws, bolts, adhesive tape and any combination thereof.

The cable organizer of the present invention includes a columnar-shaped cable spool, which is preferably sectionalized cable spool formed from cup-shaped structures. The cup-shaped structures are formed form core portions and shell portions, such as described below. The cable spool can be formed as a monolithic unit or from cup-shaped structures that are detachably fitted, secured or snapped together in a stacked or daisy-chain fashion.

In accordance with the embodiments of the invention, cup-shaped structures are detachably fitted, secured or snapped together in a stacked or daisy-chain fashion through connectors, such ball-and-socket connectors. It will be clear to one skilled in the art that the cup-shaped structures can be detachably fitted, secured or snapped together in a stacked or daisy-chain fashion through any suitable connectors, such as tongue and groove connectors, matched thread connectors, hook and loop connectors or any other connectors known in the art. The detachable feature of the cup-shaped structures, such as described above, allows the cable organizer to be customized for organizing, holding and separating more or fewer cables by adding or removing cup-shaped structures from the cable spool.

Regardless of whether a cable spool is formed as a monolithic unit or from cup structures that are fitted or snapped together, the shell portions of the cup-shaped structures are preferably flexible. The flexible shell portions can be turned up, flipped up or inverted to open positions, such that cables that are wrapped around core portions of the cup-shaped structures can be accessed.

In accordance with further embodiments of the invention, the cup-shaped structures have features for holding and securing portions of the cables. For example, the shell portions of the cup-shaped structures include one or more notched features for inserting and securing portions of cables while the cables are wrapped around the core portions of the cup-shaped structures. Alternatively, the cup-shaped structures include clips, grommets, straps or any other securing means that couple to portions of the cables while the cables are wrapped around the core portions of the cup-shaped structures.

The system of the present invention preferably includes a power supply with a plurality of power outlets. The power supply includes a power cord, an on and off switch, and a surge protector unit. The surge protector unit is a breaker switch or a fuse that is tripped when there is a rapid increase in the power load from the power supply or when the power load from the power supply is above a predetermined value. Preferably, the power supply is configured to detachably couple between the cable spool of the cable organizer and a support surface.

In a preferred embodiment of the invention, the power supply has a flattened body structure that is disk-shaped. The flattened body structure has a flattened surface for attaching to a support surface through a bracket and a flattened opposed surface. The flattened opposed surface includes an attachment feature for coupling to the cable spool, such that the cable spool extends outward from the flattened opposed surface. The power supply also preferably includes a plurality of outlets in a circular arrangement along the flattened opposed surface and surrounding the cable spool. The power outlets can be used for plugging in and providing power to the power cables organized, stored and separated by the cable organizer.

In yet further embodiments of the invention, the cable organizer includes a marking system for identifying the location of cables or cords associated with a particular electrical appliance. For example, the cable organizer include a set of stickers. A sticker is attached to mark an electrical appliance and matched stickers are used to mark cup-shaped structures that are used for storing any cables or cords associated with the marked electrical appliances. Alternatively, the cup-shaped structures are color coded or otherwise marked for use with particular types of appliances or cables.

In still further embodiments of the invention, cup-shaped structures are spring loaded and automatically spool or wind cables and controllably release cables. In accordance with this embodiment, cables can be wound or released from the cup-shaped structures with the flexible shell portions of the cup-shaped structures in upward open positions and the cables are locked in a fixed position when the flexible shell portions of the cup-shaped structures are in downward closed positions.

DETAILED DESCRIPTION

Figure 1A:
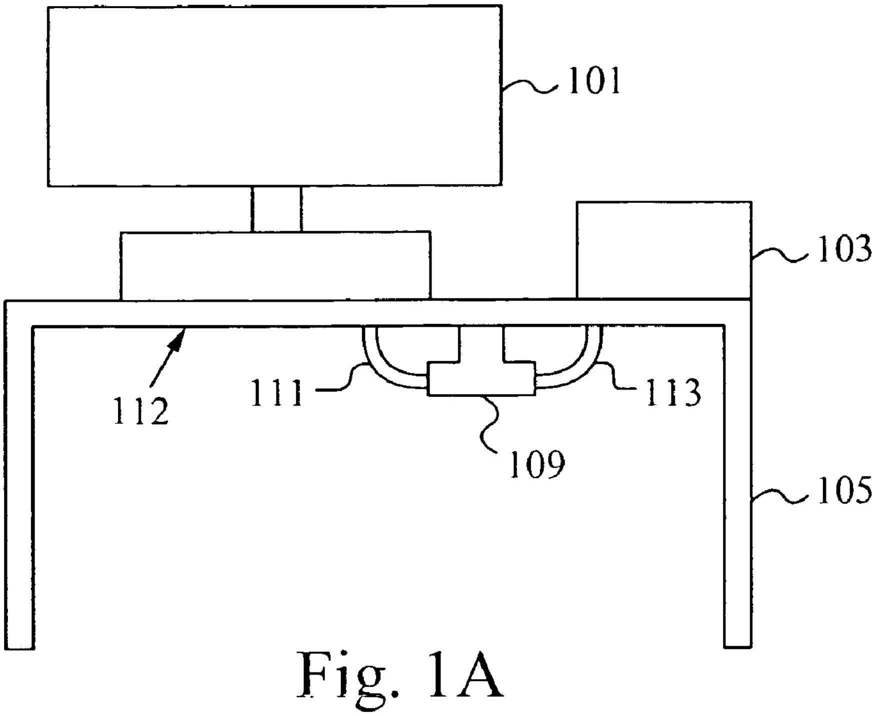
FIG. 1A shows a cable organizer mounted to an underside of a desk, in accordance with the embodiments of the invention.

FIG. 1A illustrates a spatial arrangement 100 of electrical appliances 101 and 103 that are networked through cables 111 and powered through dedicated power cables or cords 113. The electrical appliances 101 and 103 are computers, computer monitors, printers, copier machines and facsimile machines, televisions, audio players or any other type of electrical appliances. In accordance with the embodiments of the invention, a cable organizer 109 is mounted to a support surface, such as an underside 112 of a desk 105. The cable organizer 109 is used to organize, store and separate the cables 111 and the power cables or cords 113.

Figure 1B:
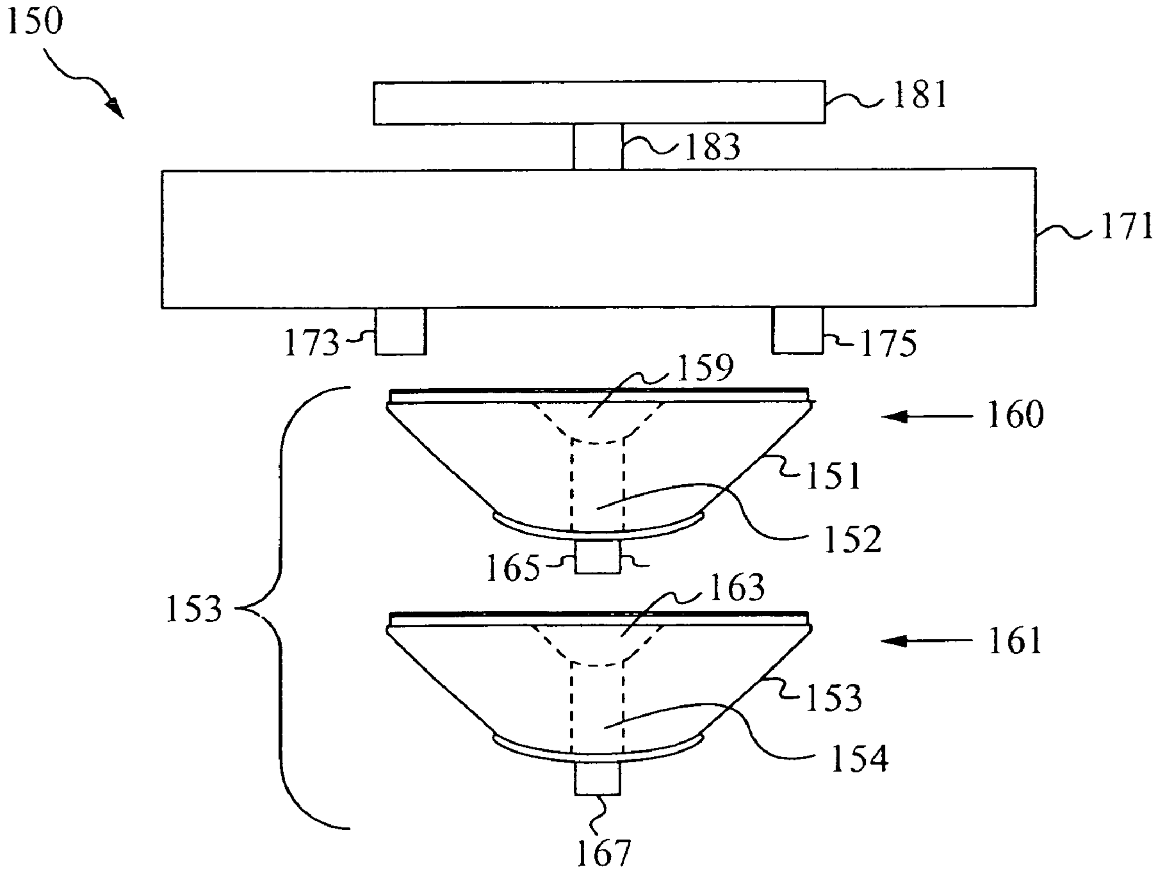
FIG. 1B shows a cable organizer with a plurality of cup-shaped structures and a power supply, in accordance with further embodiments of the invention.

Referring now to FIG. 1B, a cable organizer 150 can be permanently mounted to the support surface 181 or detachably mounted to the support surface 181 through any suitable bracketing mechanism 183 including, but not limited to, a fitted snap bracketing mechanism, a clip bracketing mechanism, a threaded bracketing mechanism, screws, bolts, adhesive tape and any combination thereof.

Still referring to FIG. 1B, the cable organizer 150 preferably includes a power supply 171, such as described in detail below with reference to FIGS. 6A-B. The cable organizer 150 also includes a cable spool 153 for holding cables (not shown). The cable spool 153 is preferably configured to detachably couple to the power supply 171 through one or more attachment features 173 and 175. The attachment features 173 and 175 are any suitable attachment features including, but not limited to, fitted or two-part snap attachment features, clip attachment features, threaded attachment features, screws, bolts, adhesive tape and any combination thereof.

The cable spool 153 is preferably formed from a plurality of cup-shaped structures 160 and 161 that are configured to snap together in a daisy chain fashion through two-part snap features 159/165 and 163/167. Each of the cup-shaped structures 160 and 161 includes a shell portion 151 and 153, respectively, for housing the cable and core portions 152 and 154, respectively, for wrapping the cable around.

Figure 2A:
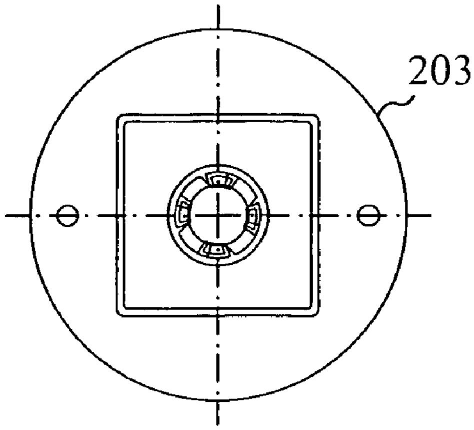
FIGS. 2A-C show views of a cup-shaped structure that includes a mounting structure and notched features for securing a cable within the cup-shaped structure, in accordance with the embodiments of the invention.
Figure 2B:
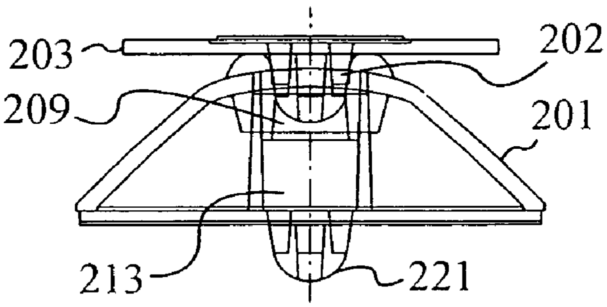
Figure 2C:
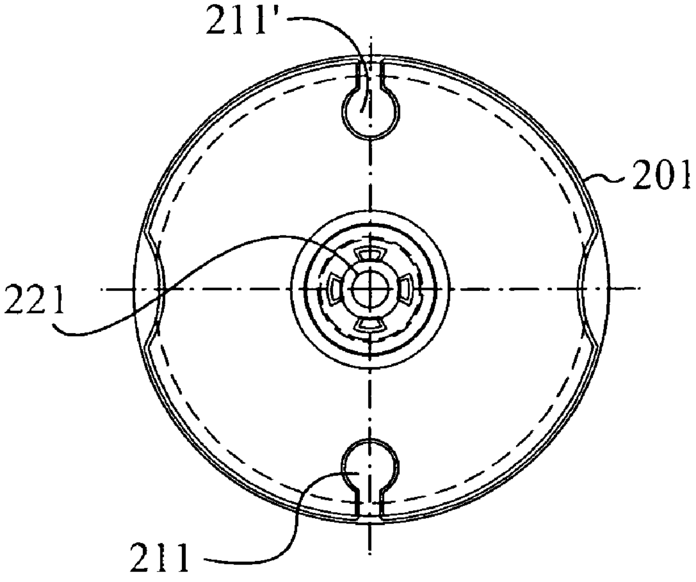

FIGS. 2A-C show views of a cup-shaped structure 200 that is coupled to a mounting feature 203. The mounting feature 203 is used for mounting a cable spool formed from cup-shaped structures, such as the cup-shaped structure 200, to the support surface 12 (FIG. 1A) and/or the power supply 171 (FIG. 1B). The mounting feature 203 is configured to detachably couple to the cup-shaped structure 200 through fitted two-part snap features 202 and 209. The cup-shaped structure 200 includes a portion of another two-part snap feature 221 for detachably coupling to other cup-shaped structures similar to the cup-shaped structure 200. The cup-shaped structure 200 also includes a shell portion 201, that is preferably flexible, and a core portion 213, such as described above. In accordance with the embodiments of the invention, the shell portion 201 of the cup-shaped structure 200 has notched features 211 and 211' for securing a portion of a cable that is housed within the cup-shaped structure 200.

Figure 3A:
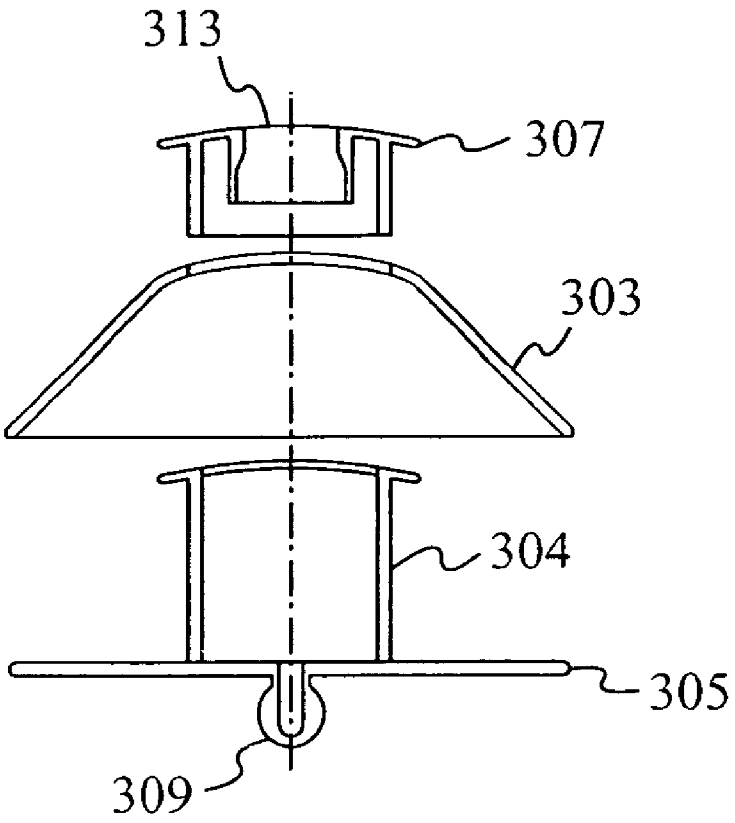
FIG. 3A shows an exploded view of a cup-shaped structure, in accordance with the embodiments of the invention.
Figure 3B:
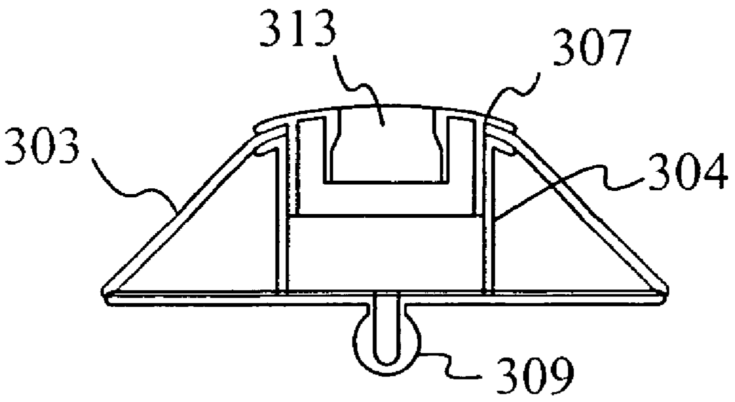
FIG. 3B shows an assembled cup-shaped structure, in accordance with the embodiments of the invention.

FIG. 3A shows an exploded view of a cup-shaped structure 300, in accordance with the embodiments of the invention. The cup-shaped structure 300 is formed from a core portion 304 with a platform 305 that fits to a top portion 307. The top portion 307 includes a socket feature 313 for receiving a ball structure (similar to the ball structure 309, described below) on another cup-shaped structure (not shown). The core portion 304 and the top portion 307 are press fitted together, or otherwise attached together, and inserted through a hole in a flexible skirt or bell-shaped shell 303 to form an assembled cup-shaped structure 300', as shown in FIG. 3B.

Figure 3C:
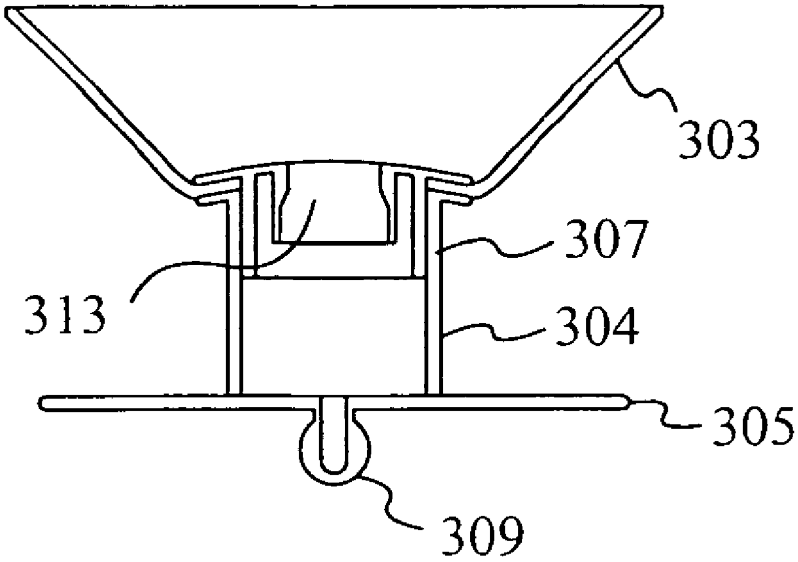
FIG. 3C shows a cup-shaped structure with a flexible shell in an upward and open position, in accordance with the embodiments of the invention.

In accordance with the embodiments of the invention, the flexible skirt or bell-shaped shell 303 is cable of being inverted flipped upward to an open position, such as shown in FIG. 3C. In the open position, a cable (not shown) that is wrapped around the core portion 404 of the cup-shaped structure 300' can be readily accessed.

Figure 3D:
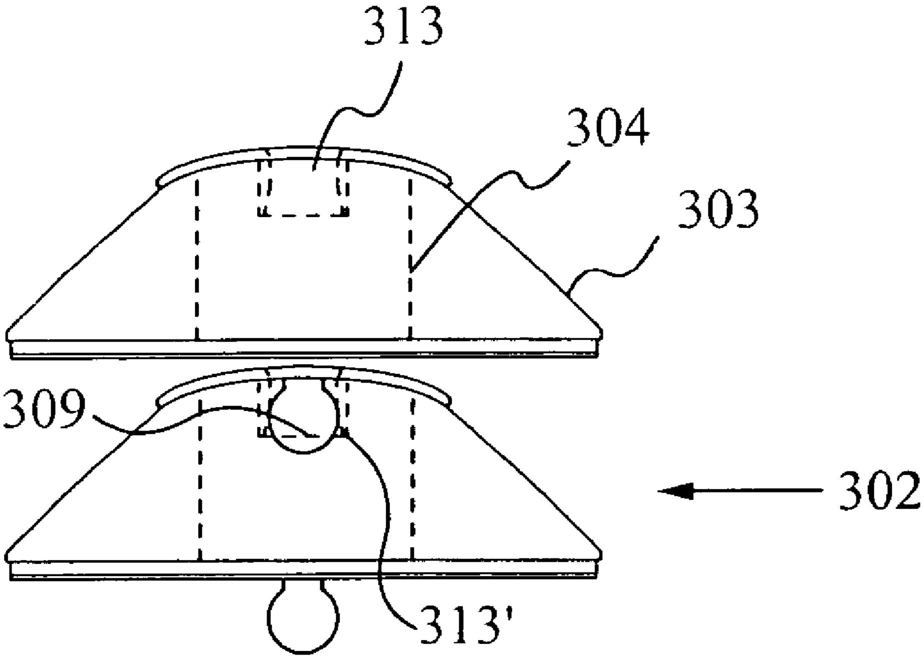
FIG. 3D shows cup-shaped structures coupled through ball-and-socket two-part snap features, in accordance with the embodiments of the invention.

Referring to FIG. 3D, the cup-shaped structure 300' is preferably configured to attach to another cup-shaped structure, such as the cup-shaped structure 302, in a daisy-chain fashion. The cup-shaped structure 300 is configured to attach to the other cup-shaped structures, such as the cup-shaped structure 302, by snapping together through, for example, the ball structure 309 on the cup-shaped structure 300 and a matched socket 313' on the cup-shaped structure 302.

Figure 4:
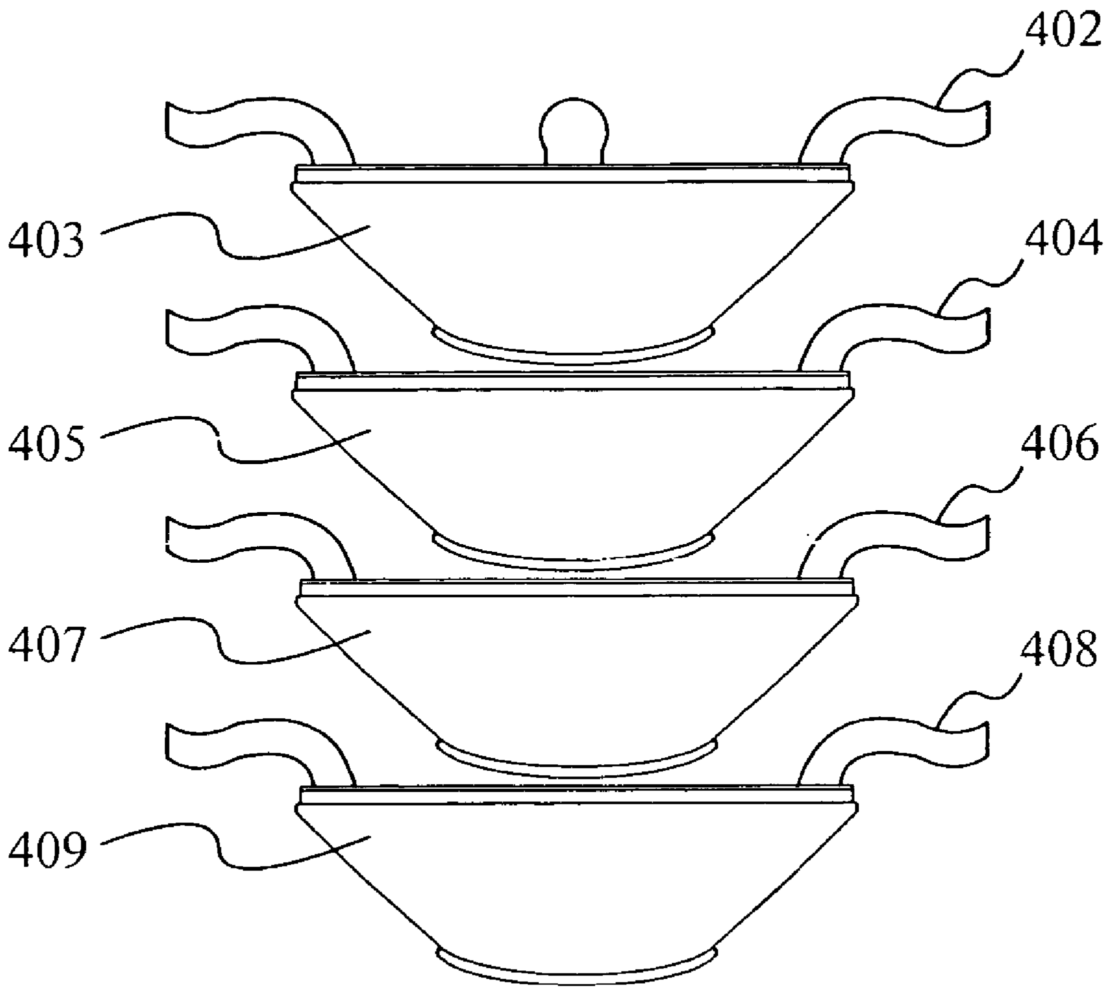
FIG. 4 shows a cable spool with a plurality of cup-shaped structures that are holding a plurality of corresponding cables, in accordance with the embodiments of the invention.

FIG. 4 shows a cable spool 400 formed form a plurality of cup-shaped structures 403, 405, 407 and 409 that are attached together in a stacked or daisy-chain fashion. The cable spool 400 is preferably configured to store and separate corresponding sets of cables 402, 404, 406 and 408.

Figure 5A:
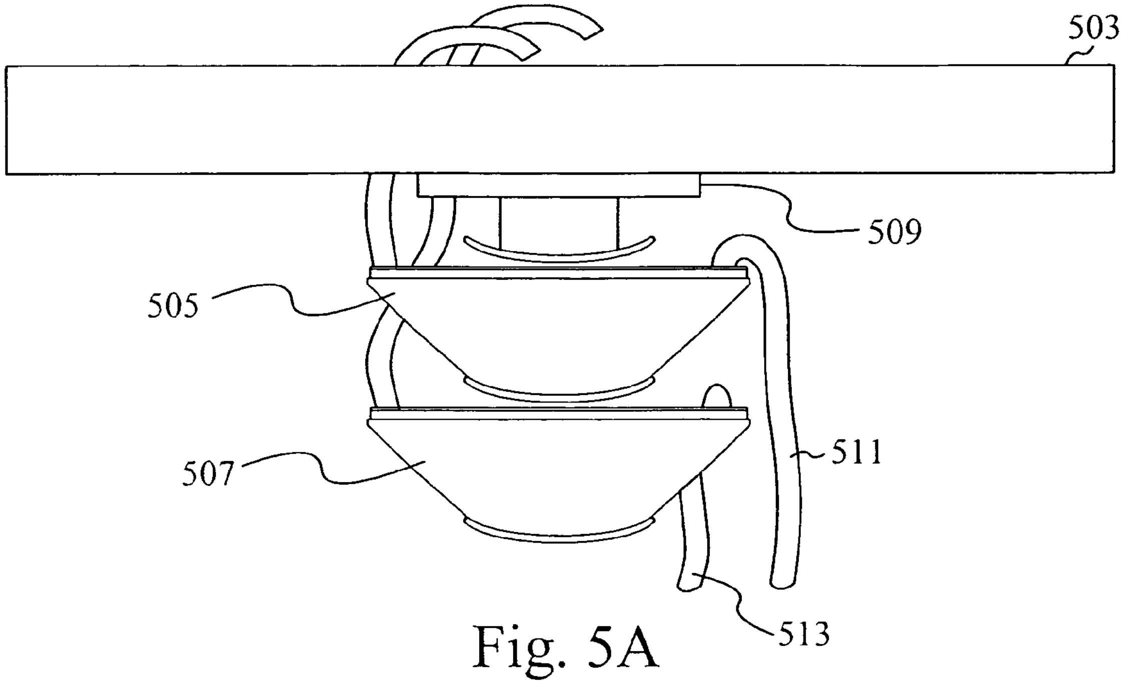
FIGS. 5A-B show a cable organizer mounted to a support surface in a downward and upward orientation, respectively.

FIG. 5A shows a cable organizer 500 that includes a cable spool formed from a plurality cup-shaped structures 505 and 507, such as described above. The cable spool is configured to hold, support and house a set of cables 511 and 513. The cable spool is configured to be mounted in a downward orientation to a support structure 503, such as a shelf, desk or work station through a bracket feature 509.

Figure 5B:
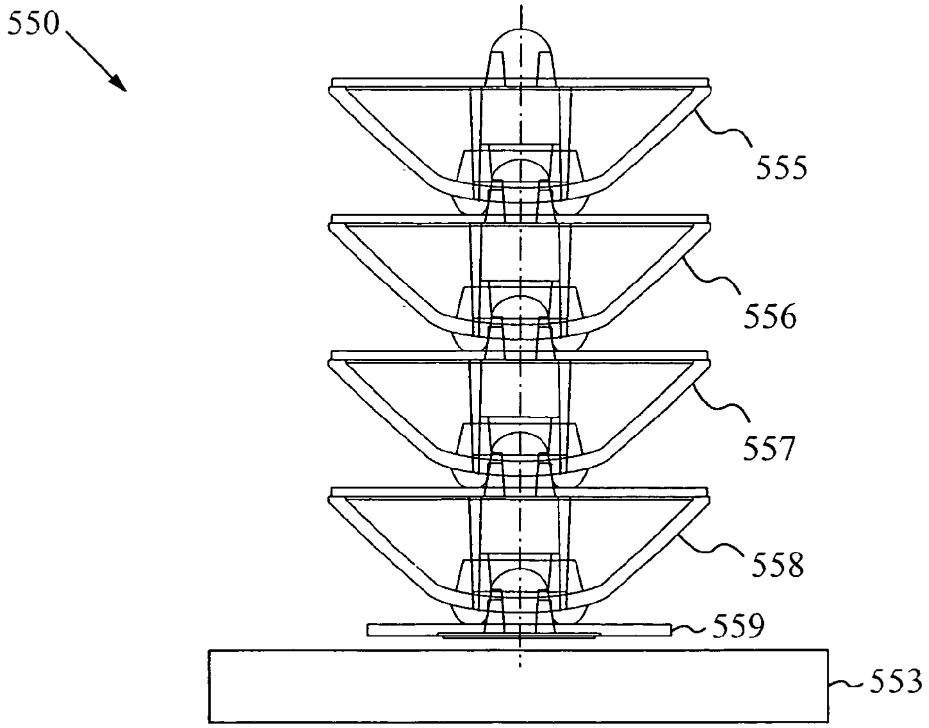

FIG. 5B shows a cable organizer 550 that includes a cable spool formed from a plurality of cup-shaped structures 555, 556, 557 and 558 fitted together in a stacked or daisy-chain fashion, such as described above. The cable spool is configured to hold, support and house a plurality of corresponding cables (not shown). The cable spool is configured to be mounted through a bracket feature 559 to a floor 553 in an upward orientation. In accordance with this embodiment the invention, the cable organizer 550 is configured to operate in an inverted upright position, as shown in FIG. 5B. It will be clear to one skilled in the art that the cable organizer of the present invention can also be mounted to a wall and operate in a horizontal orientation.

Figure 6A:
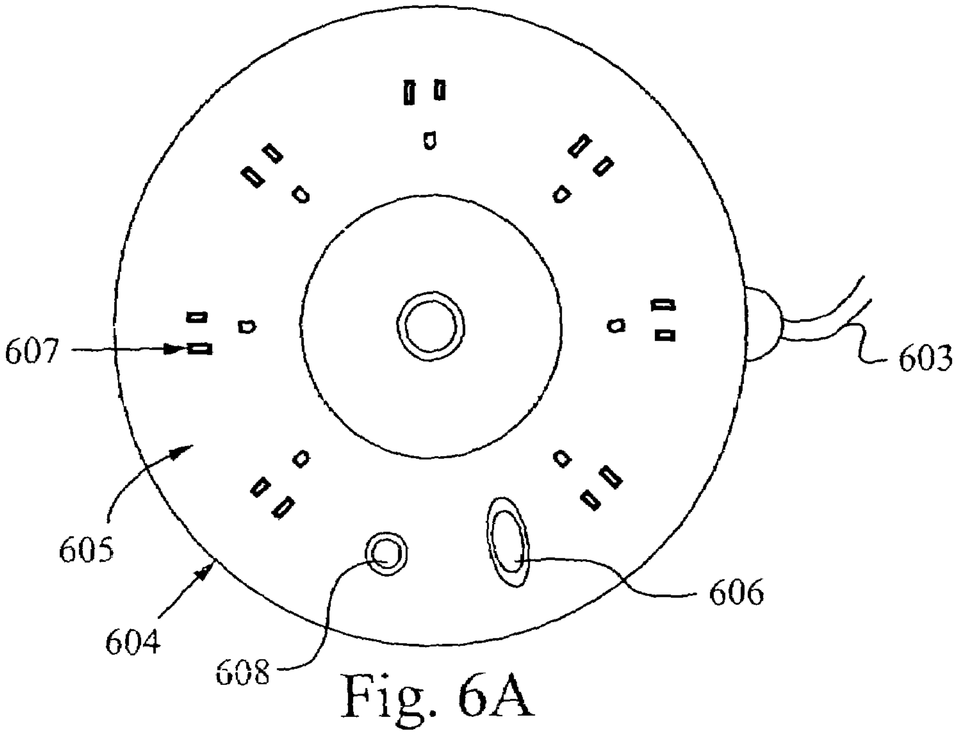
FIG. 6A shows a power supply, in accordance with yet further embodiments of the invention.
Figure 6B:
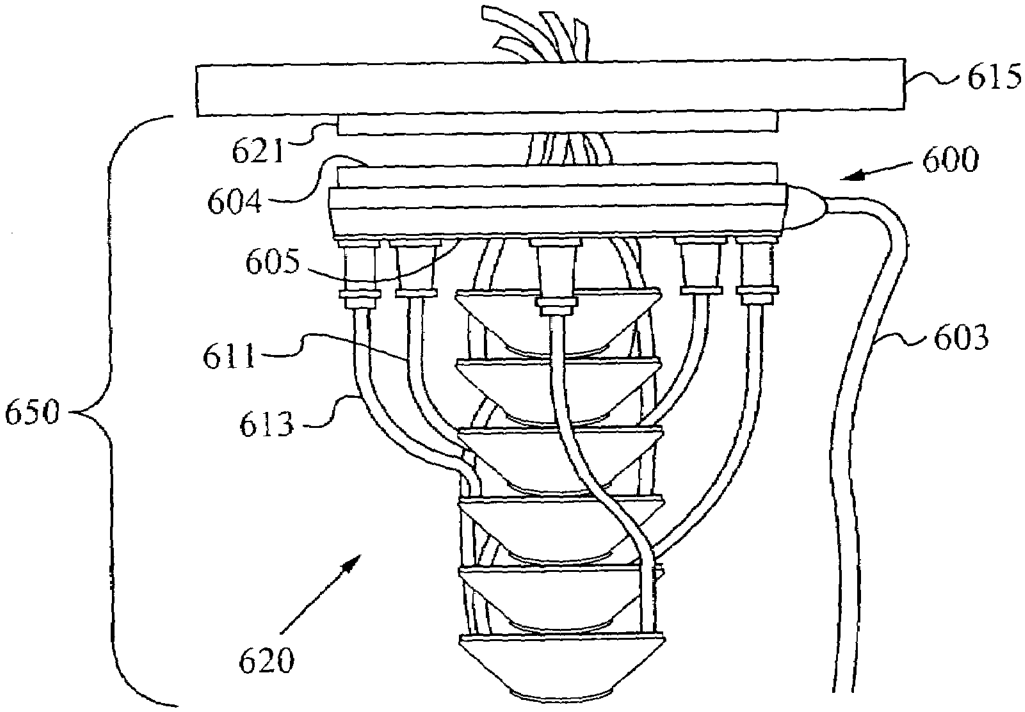
FIG. 6B shows a cable organizer with a power supply, in accordance with the embodiments of the invention.

Referring to FIGS. 6A-B, a cable organizing system 650 of the present invention preferably includes a cable spool 620 and a power supply 600, such as shown in FIG. 6A. The power supply 600 has a flattened body structure that is disk-shaped. The flattened body structure has a flattened surface 604 for attaching the cable organizing system 650 to a support surface or a support structure 615 through one or more bracket features 621, such as described above. The flattened body structure also has a flattened opposed surface 605 that includes one or more attachment features for attaching to the cable spool 620, such as described in detail above. The cable spool 620 is preferably mounted to the power supply 600, such that the cable spool 620 extends outward from the flattened opposed surface 605, such as shown.

The power supply 600 also preferably includes a power cord 603, an on and off switch 606 and a surge protector unit 608. The surge protector unit 608 is a breaker switch or a fuse that is tripped when there is a rapid increase in the power load from the power supply 600 or when the power load from the power supply 600 is above a predetermined value. Preferably, the power supply 600 is configured to detachably couple between the cable spool 620 of the cable organizing system 650 and/or the support surface or support structure 615. The power supply 600 also preferably includes a plurality of outlets 607 that are located in a circular arrangement along the flatted opposed surface 605, such that the plurality of outlets surround the cable spool 620. The power outlets 607 can be used for plugging in and providing power to the cables 611 and 613 while the cables 611 and 613 are organized, stored and separated by the cable organizing system 650.

In yet further embodiments of the invention the cable organizing system 650 includes cup-shaped structures that are marked to help identify cables associated with particular appliances. In still further embodiments of the invention, the cup-shaped structures of the cable spool 620 are spring loaded and configured to automatically coil, spool or wind cable.

The cable organizer of the present invention helps to control the tangle of electrical cables and/or other cables that typically exist when configuring groups of networked electrical appliances. The cable organizer of the present invention is readily adaptable to changes in the number, type or spatial arrangement of the electrical appliances.

It will be clear to one skilled in the art, from the description provided above, and the appended claims below, that the cable organizer of the present invention can be fabricated in a number of different ways and have a number of different geometries. Accordingly, the proceeding preferred embodiment of the invention is set forth without any loss of generality to, and without imposing limitations upon, the claimed invention.

What is claimed is:

1. A device comprising:

a) a plurality of cup-shaped structures with connectors for detachably connecting the cup-shaped structures in a stacked columnar fashion to form a cable spool; and b) means for attaching the cable spool to a surface, wherein the cup-shaped structures include shell portions that are flexible and capable of being inverted, while the cable spool formed is stationary.

2. The device of claim 1, wherein the shell portions have one or more notched features for inserting and holding a portion of a cable.

3. The device of claim 1, wherein the connectors include two-part snap features that form the cable spool between adjacent cup-shaped structures.

4. The device of claim 3, wherein the two-part snap features are ball-and-socket two-part snap features.

5. The device of claim 1, further comprising a power supply with a plurality of power outlets.

6. The device of claim 5, wherein the power supply includes a power cord and an on and off switch.

7. The device of claim 5, wherein the power supply includes a surge protector.

8. The device of claim 7, wherein the surge protector includes a breaker switch.

9. The device of claim 5, wherein the power supply is configured to detachably couple between the cable spool and the means for attaching the cable spool to the surface.

10. A cable organizer comprising:

a) a sectionalized cable spool with central core sections separated through flexible shell portions for holding and separating cables that are wrapped around the central core portions of the sectionalized cable spool, wherein the flexible shell portions include notched features for securing the cables while the cables are wrapped around the central core portions of the sectionalized cable spool and wherein the sections detachably coupled together in a daisy chain fashion through connectors; and b) means for attaching the sectionalized cable spool to a surface.

11. The cable organizer of claim 10, wherein the connectors are two-part snap features.

12. The cable organizer of claim 10, wherein the: means for attaching the sectionalized cable spool to the surface includes a power supply for providing power to the cables.

13. The cable organizer of claim 12, wherein the power supply includes a power cord, an on-and-off switch and a power surge protection unit.

14. A system comprising:

a) cable spool with stacked cup-shaped structures forming sections for holding and separating cables while the cables are wrapped around the cable spool;

b) a power supply comprising:

i) a power cord for plugging into a power outlet;

ii) a surface for attaching to a support structure and an opposed surface for attaching to the cable spool such that the cable spool extends outward from the opposed surface; and iii) a plurality of outlets for plugging in the cables and providing power to the cables while the cables are wrapped around the cable spool; and c) a bracket feature for attaching the power supply to the support structure.

15. The system of claim 14, wherein the plurality outlets are arranged on the opposed surface such that the plurality outlets surround the cable spool.

16. The system of claim 14, wherein the power supply further includes a surge protector.

17. The system of claim 14, wherein at least a portion of the cup-shaped structures detachably couple together.

* * * * *